United States Patent
Zhang et al.

(10) Patent No.: US 10,499,255 B2
(45) Date of Patent: Dec. 3, 2019

(54) DISCOVERY REFERENCE SIGNAL (DRS) SEARCH MODES AND MODE SWITCHING TECHNIQUES

(71) Applicant: QUALCOMM Incorporated, San Diego, CA (US)

(72) Inventors: Wenshu Zhang, San Diego, CA (US); Chengjin Zhang, San Diego, CA (US); Alexei Yurievitch Gorokhov, San Diego, CA (US); Amir Aminzadeh Gohari, Sunnyvale, CA (US); Yongle Wu, San Diego, CA (US); Supratik Bhattacharjee, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/937,212

(22) Filed: Mar. 27, 2018

(65) Prior Publication Data
US 2018/0288624 A1    Oct. 4, 2018

Related U.S. Application Data

(60) Provisional application No. 62/480,326, filed on Mar. 31, 2017.

(51) Int. Cl.
*H04W 16/14* (2009.01)
*H04L 27/26* (2006.01)
(Continued)

(52) U.S. Cl.
CPC ........... *H04W 16/14* (2013.01); *H04L 5/0048* (2013.01); *H04L 27/261* (2013.01); *H04W 48/16* (2013.01)

(58) Field of Classification Search
CPC .................................................. H04W 16/14
See application file for complete search history.

(56) References Cited

U.S. PATENT DOCUMENTS

| 9,730,166 B2 | 8/2017 | Frenger et al. |
| 2016/0135148 A1* | 5/2016 | Novlan ............ H04L 1/00 370/329 |

(Continued)

FOREIGN PATENT DOCUMENTS

| WO | WO-2016186406 A1 * | 11/2016 | ............ H04L 27/26 |
| WO | WO-2017049906 A1 | 3/2017 | |

OTHER PUBLICATIONS

3GPP TR 36.889: "3rd Generation Partnership Project; Technical Specification Group Radio Access Network; Study on Licensed-Assisted Access to Unlicensed Spectrum", Release 13, 3GPP Draft, V13.0.0, 36889-D00, 3rd Generation Partnership Project (3GPP), Mobile Competence Centre, 650, Route Des Lucioles, F-06921 Sophia-Antipolis Cedex, France, Jun. 30, 2015 (Jun. 30, 2015), pp. 1-87, Retrieved from the Internet: URL: http://www.3gpp.org/ftp/tsg_ran/WG1_RL1/DRAFT/ [retrieved on Jun. 30, 2015].

(Continued)

*Primary Examiner* — Samina F Choudhry
(74) *Attorney, Agent, or Firm* — Arent Fox, LLP

(57) ABSTRACT

Aspects of the present disclosure provide a plurality of discovery reference signal (DRS) search modes implemented by the user equipment (UE) during contention-based communication in an unlicensed spectrum. The plurality of DRS search modes may include a first DRS search mode ("Full search mode"), second DRS search mode ("Comb search mode"), and a third DRS search mode ("Thin search mode"). The DRS search modes may be selected by the UE based on the system requirements (e.g., tradeoffs between robustness and complexity against cycle cost). Features of the present disclosure further provide techniques for dynamically switching between the plurality of DRS search modes in order to minimize power consumption while reducing the number of cycles required to locate the DRS.

28 Claims, 9 Drawing Sheets

(51) Int. Cl.
*H04W 48/16* (2009.01)
*H04L 5/00* (2006.01)

(56) References Cited

U.S. PATENT DOCUMENTS

| 2017/0135029 A1 | 5/2017 | Chendamarai et al. |
| 2017/0208638 A1 | 7/2017 | Baghel et al. |
| 2017/0251456 A1 | 8/2017 | Radulescu et al. |
| 2017/0311316 A1 | 10/2017 | Chendamarai et al. |

OTHER PUBLICATIONS

CMCC: "Discussion on Discovery Signal Design for LAA," 3GPP Draft; R1-155786, 3rd Generation Partnership Project (3GPP), Mobile Competence Centre; 650, Route Des Lucioles; F-06921 Sophia-Antipolis Cedex; France, vol. RAN WG1, No. Malmo, Sweden; Oct. 5, 2015-Oct. 9, 2015, Oct. 4, 2015 (Oct. 4, 2015), XP051039753, 4 pages, Retrieved from the Internet: URL:http://www.3gpp.org/ftp/Meetings_3GPP_SYNC/RAN1/Docs/ [retrieved on Oct. 4, 2015].

International Search Report and Written Opinion—PCT/US2018/024819—ISA/EPO—dated Jun. 20, 2018.

Panasonic: "DRS Design for LAA", 3GPP DRAFT, R1-152692, 3rd Generation Partnership Project (3GPP), Mobile Competence Centre, 650, Route Des Lucioles, F-06921 Sophia-Antipolis Cedex, France, vol. RAN WG1. No. Fukuoka, Japan, May 25, 2015-May 29, 2015, May 15, 2015 (May 15, 2015), XP050972657, Retrieved from the Internet: URL: http://www.3gpp.org/ftp/tsg_ran/WG1_RL1/TSGR1_81/Docs/ [retrieved on May 15, 2015].

Qualcomm Incorporated: "Remaining Details of Subframe Types," 3GPP Draft; R1-157043 Remaining Details of Subframe Types, 3rd Generation Partnership Project (3GPP), Mobile Competence Centre ; 650, Route Des Lucioles ; F-06921 Sophia-Antipolis Cedex ; France vol. RAN WG1, No. Anaheim, USA; Nov. 14, 2015-Nov. 14, 2015 Nov. 15, 2015 (Nov. 15, 2015), XP051003346 Retrieved from the Internet: URL:http://www.3gpp.org/ftp/Meetings_3GPP_SYNC/RAN1/Docs/[retrieved on Nov. 11, 2015], 4 pages.

\* cited by examiner

DISCOVERY REFERENCE SIGNAL (DRS) SEARCH MODES AND MODE SWITCHING TECHNIQUES

CROSS-REFERENCE TO RELATED APPLICATION(S)

This application claims benefit of U.S. Provisional Application Ser. No. 62/480,326 entitled "DISCOVERY REFERENCE SIGNAL (DRS) SEARCH MODES AND MODE SWITCHING TECHNIQUES" and filed Mar. 31, 2017, which is expressly incorporated by reference herein in its entirety.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. By way of example, a wireless multiple-access communication system may include a number of base stations, each simultaneously supporting communication for multiple communication devices, otherwise known as user equipment (UEs). A base station may communicate with UEs on downlink channels (e.g., for transmissions from a base station to a UE) and uplink channels (e.g., for transmissions from a UE to a base station).

Some modes of communication may enable communications between a base station and a UE over a contention-based shared radio frequency spectrum band, or over different radio frequency spectrum bands (e.g., a licensed radio frequency spectrum band or an unlicensed radio frequency spectrum band) of a cellular network. With increasing data traffic in cellular networks that use a licensed radio frequency spectrum band, offloading of at least some data traffic to an unlicensed radio frequency spectrum band may provide a cellular operator with opportunities for enhanced data transmission capacity. An unlicensed radio frequency spectrum band may also provide service in areas where access to a licensed radio frequency spectrum band is unavailable.

Prior to gaining access to, and communicating over, a contention-based shared radio frequency spectrum band, a base station or UE may perform a listen before talk (LBT) procedure to contend for access to the shared radio frequency spectrum band. An LBT procedure may include performing a clear channel assessment (CCA) procedure to determine whether a channel of the contention-based shared radio frequency spectrum band is available.

5G new radio (NR) communications technology is envisaged to expand and support diverse usage scenarios and applications with respect to current mobile network generations. In an aspect, 5G NR communications technology includes enhanced mobile broadband addressing human-centric use cases for access to multimedia content, services and data; ultra-reliable-low latency communications (URLLC) with strict requirements, especially in terms of latency and reliability; and massive machine type communications for a very large number of connected devices and typically transmitting a relatively low volume of non-delay-sensitive information. As the demand for mobile broadband access continues to increase, however, there exists a need for further improvements in 5G NR communications technology and beyond.

SUMMARY

Aspects of the present disclosure provide techniques for implementing a plurality of discovery reference signal (DRS) search modes in a wireless communication system that supports offloading of cellular communication to an unlicensed spectrum. In accordance with features of the present disclosure, the licensed assisted access (LAA) may provide supplemental downlink service with secondary component carrier placed in an unlicensed spectrum. In order to support radio resource management (RRM) in an environment that requires listen before talk (LBT) procedures, while operating in an unlicensed spectrum, the LAA may adopt DRS. The DRS may include a combination of one or more synchronization signals (primary synchronization signal (PSS) and a secondary synchronization signal (SSS)) to assist the UE in obtaining the cell identity and coarse frequency and time synchronization. The DRS may also include a cell-specific reference signal (CRS) to assist in obtaining fine frequency and time synchronization and cell measurement. Finally, the DRS may also include CSI reference signals that may be useful in determining the transmission point identity within the cell.

As set forth in detail below, DRS for a LAA may occur in any subframe within the DRS measurement timing configuration (DMTC) window that is subject to the LBT procedures. In some examples, the DMTC window may be 6 milliseconds (ms). While conventional techniques require the UE to search each subframe in the DMTC window in order to obtain the DRS, such searches can be resource intensive and adversely impact the power consumption (e.g., battery life) of the UE.

To that end, aspects of the present disclosure provide a plurality of DRS search modes that may include a first DRS search mode ("Full search mode"), second DRS search mode ("Comb search mode"), and a third DRS search mode ("Thin search mode"). The DRS search modes may be selected by the UE based on the system requirements (e.g., tradeoffs between robustness and complexity against cycle cost). Features of the present disclosure further provide techniques for dynamically switching between the plurality of DRS search modes in order to minimize power consumption while reducing the number of cycles required to locate the DRS.

In accordance with various aspects of the present disclosure, a method, for wireless communications is disclosed. The method may include identifying, at a UE, a DMTC window for receiving a DRS signal. The method may further include selecting a DRS search mode for the UE from a plurality of DRS search modes available to the UE. The plurality of DRS search modes may include at least one or more of a first DRS search mode, a second DRS search mode, or a third DRS search mode. The method may further include determining a DRS search location within the DMTC window based on the DRS search mode selected. In some examples, the method may further include searching, by the UE, within one or more subframes received within the DMTC window to identify the DRS signal.

In another example, an apparatus for wireless communications in an unlicensed spectrum is disclosed. The apparatus may include a memory configured to store instructions, and a processor communicatively coupled with the memory. The processor may be configured to execute the instructions to identify, at a UE, a DMTC window for receiving a DRS signal. The processor may be further configured to execute instructions to select a DRS search mode for the UE from a plurality of DRS search modes available to the UE. The plurality of DRS search modes may include at least one or more of a first DRS search mode, a second DRS search mode, or a third DRS search mode. The processor may be further configured to execute instructions to determine a DRS search location within the DMTC window based on the DRS search mode selected. In some examples, the processor may be further configured to execute instructions to search, by the UE, within one or more subframes received within the DMTC window to identify the DRS signal.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
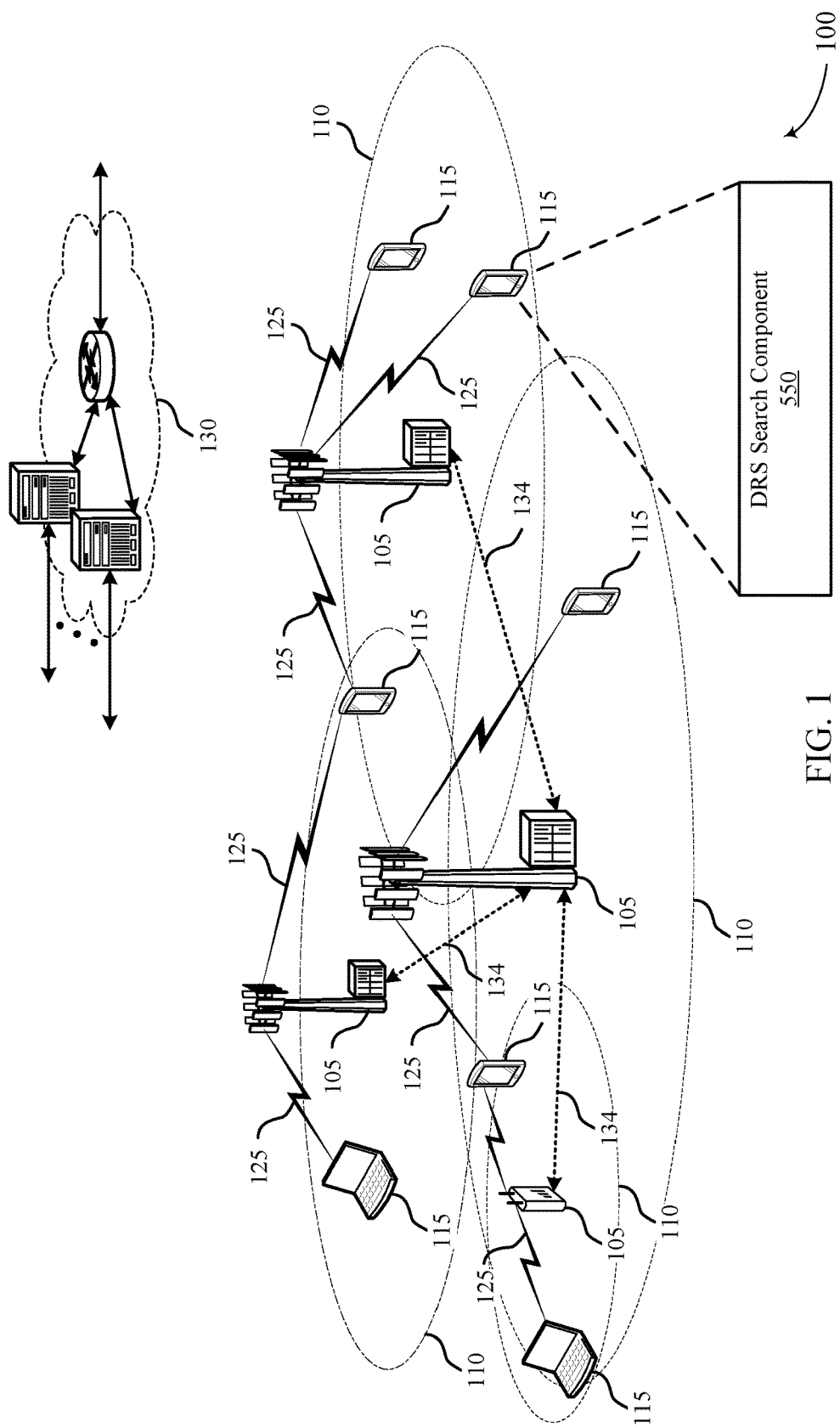
FIG. 1 shows a diagram that illustrates an example of a wireless communication system in accordance with aspects of the present disclosure.

Techniques are described in which an unlicensed radio frequency spectrum band is used for at least a portion of contention-based communications over a wireless communication system. In some examples, a contention-based shared radio frequency spectrum band may be used for LTE/LTE-A communications. The contention-based radio frequency spectrum band may be used in combination with, or independent from, a non-contention licensed radio frequency spectrum band. In some examples, the contention-based radio frequency spectrum band may be a radio frequency spectrum band for which a device may also need to contend for access because the radio frequency spectrum band is available, at least in part, for unlicensed use, such as WiFi use.

With increasing data traffic in cellular networks that use a licensed radio frequency spectrum band, offloading of at least some data traffic to a contention-based shared radio frequency spectrum band, such as in an unlicensed band, may provide a cellular operator (e.g., an operator of a public land mobile network (PLMN) or a coordinated set of base stations defining a cellular network, such as an LTE/LTE-A network) with opportunities for enhanced data transmission capacity. As noted above, before communicating over a contention-based shared radio frequency spectrum band, such as unlicensed spectrum, devices may perform a LBT procedure to gain access to the shared radio frequency spectrum band. Such LBT procedure may include performing a CCA procedure (or an extended CCA procedure) to determine whether a channel of the unlicensed radio frequency spectrum band is available. When it is determined that the channel of the contention-based radio frequency spectrum band is available, a channel reserving signal (e.g., a CUBS) may be transmitted to reserve the channel. When it is determined that a channel is not available, a CCA procedure (or extended CCA procedure) may be performed for the channel again at a later time.

Due to the LBT procedural requirements, the traffic on the unlicensed spectrum is generally bursty (i.e., burst transmission or data burst that broadcasts relatively high-bandwidth transmission over a short period), and thus cannot be guaranteed to a fixed transmission timing. Such inconsistency in the transmissions generally poses a challenge for radio resource management (RRM) because it relies on the persistent presence of synchronization signals such as a primary synchronization signal (PSS), a secondary synchronization signal (SSS), a cell-specific reference signal (CRS) and/or a channel state information-reference signal (CSI-RS) for cell search and measurement.

In order to increase the likelihood of PSS/SSS/CRS/CSI-RS transmission for RRM, LAA for LTE adopts the DRS for unlicensed spectrum, a subframe that contains PSS/SSS/CRS, and allows the DRS to be transmitted on any subframe within a 6 ms window. The 6 ms window within which the DRS may occur may be referred to as the DRS measurements timing configuration (DMTC). The periodicity of the DRS occasions may be set to 40, 80, or 160 ms. As such, for an unlicensed LAA, RRM measurement for unlicensed carriers may be based on DRS that can "float" within any subframe. Within the DMTC, the device (e.g., UE) may search for discovery signals. For each of the discovery signals found fulfilling the triggering condition, the UE may report the reference signal received power (RSRP) and/or reference signal received quality (RSRQ) together with information for cell and transmission point identification.

In contrast, for licensed LTE (e.g., communications over licensed spectrum), RRM measurement may be based on PSS/SSS/CRS with fixed timing. In other words, in the licensed spectrum, the PSS/SSS are generally transmitted consistently in subframes 0 and subframe 5, while the CRS is included in every subframe. As such, in the licensed spectrum, a receiving device (e.g., UE) may limit the search location of the reference signals based on the fixed timing configurations. However, with respect to unlicensed spectrum, the LAA may not have the same latitude as is afforded for the licensed LTE communications.

Thus, because the DRS may occur in any subframe within the DMTC window, conventional techniques require the UE to search each subframe in the DMTC window in order to obtain the DRS. Such searches can be resource intensive and adversely impact the power consumption (e.g., battery life) of the UE.

Features of the present disclosure address the above-identified problem by implementing a plurality of DRS search modes that may be adopted based on the system requirements (e.g., tradeoffs between robustness and complexity against cycle cost). The plurality of DRS search modes may include a first DRS search mode ("Full search mode") that may perform a full search of the DMTC window (e.g., search all the samples in each of the plurality of subframes transmitted during the DMTC window for the DRS). Such a search may be resource intensive because the search requires the UE to search all samples in each subframe that may or may not contain the DRS. However, the first DRS search mode that performs the full search may be advantageous during original cell search opportunities or when the UE is having difficulty locating the DRS in other less systematic search modes (e.g., second DRS search mode and/or third DRS search mode, described below).

On the opposite end of the spectrum of the first DRS search mode that performs full search of the DMTC window may be the third DRS search mode ("Thin search mode"). The third DRS search mode may identify a single narrow window within the full 6 ms DMTC window to perform the DRS search. In some aspects, the single narrow window may be around a Primary Cell (PCell) PSS symbol boundary of the first subframe (subframe 0) or fifth subframe (subframe 5). The third DRS search mode may offer the lowest robustness and only support synchronous networks. Further, the third DRS search mode may support fixed, but not floating DRS. However, the advantage of the third DRS search mode may be based on the lowest cycle/timeline cost realization that significantly reduces the search timeline. This may be most efficient if the network deploys synchronous timing among neighboring cells and DRS subframe location is fixed with the DMTC window which may happen if the operator/base station chooses to simplify LAA network configuration.

Between the first DRS search mode and the third DRS search mode, may be a balanced search approach of a second DRS search mode ("Comb search"). In the example of the third DRS search mode, the UE may search over narrow windows within the full 6 ms DMTC window (e.g., 6 narrow windows, with one narrow window in each subframe). In other words, in contrast to the first DRS search mode that searches each orthogonal frequency-division multiplexing (OFDM) symbol of each subframe within the DMTC window, the second DRS search mode allows the UE to search a subset of samples of each subframe. In particular, the UE may search around the 6 PCell PSS symbol boundaries in DMTC because the secondary carrier timing may only be offset from the primary carrier timing by a predetermined offset. Thus, instead of searching the entire subframe (as is performed for first DRS search mode), the second DRS search mode identifies the timing of the primary carrier, and determines the secondary carrier timing based on the predetermined offset from the primary carrier. The second DRS search mode may provide a balanced approach from the two extremes of the first DRS search mode (i.e., "full search") and the third DRS search mode (i.e., "thin search"). Thus, while the second DRS search mode may offer reduced cycles and search time compared to the first DRS search mode, the second DRS search mode may be limited to supporting synchronous neighbor cells (e.g., not supporting asynchronization neighbor cells). Compared with the third DRS search mode, the second DRS search mode may support floating DRS. Aspects of the present disclosure also provide techniques for UE to dynamically switch between each of the plurality of DRS search modes.

Various aspects are now described in more detail with reference to the FIGS. 1-6. In the following description, for purposes of explanation, numerous specific details are set forth in order to provide a thorough understanding of one or more aspects. It may be evident, however, that such aspect(s) may be practiced without these specific details. Additionally, the term "component" as used herein may be one of the parts that make up a system, may be hardware, firmware, and/or software stored on a computer-readable medium, and may be divided into other components.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Referring to FIG. 1, in accordance with various aspects of the present disclosure, an example wireless communication network 100 may include one or more base stations 105, one or more UEs 115, and a core network 130. The core network 130 may provide user authentication, access authorization, tracking, internet protocol (IP) connectivity, and other access, routing, or mobility functions. The base stations 105 may interface with the core network 130 through backhaul links 134 (e.g., S1, etc.). The base stations 105 may perform radio configuration and scheduling for communication with the UEs 115, or may operate under the control of a base station controller (not shown). In various examples, the base stations 105 may communicate, either directly or indirectly (e.g., through core network 130), with one another over backhaul links 134 (e.g., X1, etc.), which may be wired or wireless communication links. In some examples, one or more UEs 115 may include a DRS search component 550 to perform one or more techniques of the present disclosure. Components and sub-components of the DRS search component 550 are described in detail with reference to FIG. 5.

The base stations 105 may wirelessly communicate with the UEs 115 via one or more base station antennas. Each of the base stations 105 may provide communication coverage for a respective geographic coverage area 110. In some examples, base stations 105 may be referred to as a base transceiver station, a radio base station, an access point, a radio transceiver, a NodeB, eNodeB (eNB), Home NodeB, a Home eNodeB, a relay, or some other suitable terminology. The geographic coverage area 110 for a base station 105 may be divided into sectors or cells making up only a portion of the coverage area (not shown). The wireless communication network 100 may include base stations 105 of different types (e.g., macro base stations or small cell base stations, described below). Additionally, the plurality of base stations 105 may operate according to different ones of a plurality of communication technologies (e.g., 5G, 4G/LTE, 3G, Wi-Fi, Bluetooth, etc.), and thus there may be overlapping geographic coverage areas 110 for different communication technologies.

In some examples, the wireless communication network 100 may be or include a Long Term Evolution (LTE) or LTE-Advanced (LTE-A) technology network. The wireless communication network 100 may also be a next generation technology network, such as a 5G NR wireless communication network. In LTE/LTE-A networks, the term evolved node B (eNB) may be generally used to describe the base stations 105, while the term UE may be generally used to describe the UEs 115. The wireless communication network 100 may be a heterogeneous LTE/LTE-A network in which different types of eNBs provide coverage for various geographical regions. For example, each eNB or base station 105 may provide communication coverage for a macro cell, a small cell, or other types of cell. The term "cell" is a 3GPP term that can be used to describe a base station, a carrier or component carrier associated with a base station, or a coverage area (e.g., sector, etc.) of a carrier or base station, depending on context.

A macro cell may generally cover a relatively large geographic area (e.g., several kilometers in radius) and may allow unrestricted access by the UEs 110 with service subscriptions with the network provider.

A small cell may include a relative lower transmit-powered base station, as compared with a macro cell, that may operate in the same or different frequency bands (e.g., licensed, unlicensed, etc.) as macro cells. Small cells may include pico cells, femto cells, and micro cells according to various examples. A pico cell, for example, may cover a small geographic area and may allow unrestricted access by the UEs 115 with service subscriptions with the network provider. A femto cell may also cover a small geographic area (e.g., a home) and may provide restricted access and/or unrestricted access by the UEs 115 having an association with the femto cell (e.g., in the restricted access case, the UEs 115 in a closed subscriber group (CSG) of the base station 105, which may include the UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The communication networks that may accommodate some of the various disclosed examples may be packet-based networks that operate according to a layered protocol stack and data in the user plane may be based on the IP. A radio link control (RLC) layer may perform packet segmentation and reassembly to communicate over logical channels. A MAC layer may perform priority handling and multiplexing of logical channels into transport channels. The MAC layer may also use hybrid automatic repeat request (HARQ) to provide retransmission at the MAC layer to improve link efficiency. In the control plane, the radio resource control (RRC) protocol layer may provide establishment, configuration, and maintenance of an RRC connection between a UE 115 and the base stations 105. The RRC protocol layer may also be used for core network 130 support of radio bearers for the user plane data. At the physical (PHY) layer, the transport channels may be mapped to physical channels.

The UEs 115 may be dispersed throughout the wireless communication network 100, and each UE 115 may be stationary or mobile. A UE 115 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, an entertainment device, a vehicular component, or any device capable of communicating in wireless communication network 100. Additionally, a UE 115 may be Internet of Things (IoT) and/or machine-to-machine (M2M) type of device, e.g., a low power, low data rate (relative to a wireless phone, for example) type of device, that may in some aspects communicate infrequently with wireless communication network 100 or other UEs. A UE 115 may be able to communicate with various types of base stations 105 and network equipment including macro eNBs, small cell eNBs, relay base stations, and the like.

A UE 115 may be configured to establish one or more wireless communication links 125 with one or more base stations 105. The wireless communication links 125 shown in wireless communication network 100 may carry UL transmissions from a UE 115 to a base station 105, or downlink (DL) transmissions, from a base station 105 to a UE 115. The downlink transmissions may also be called forward link transmissions while the uplink transmissions may also be called reverse link transmissions. Each wireless communication link 125 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. In an aspect, the communication links 125 may transmit bidirectional communications using frequency division duplex (FDD) (e.g., using paired spectrum resources) or time division duplex (TDD) operation (e.g., using unpaired spectrum resources). Frame structures may be defined for FDD (e.g., frame structure type 1) and TDD (e.g., frame structure type 2). Moreover, in some aspects, the communication links 125 may represent one or more broadcast channels.

In some aspects of the wireless communication network 100, base stations 105 or UEs 115 may include multiple antennas for employing antenna diversity schemes to improve communication quality and reliability between base stations 105 and UEs 115. Additionally or alternatively, base stations 105 or UEs 115 may employ multiple input multiple output (MIMO) techniques that may take advantage of multi-path environments to transmit multiple spatial layers carrying the same or different coded data.

The wireless communication network 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both FDD and TDD component carriers.

Figure 2:
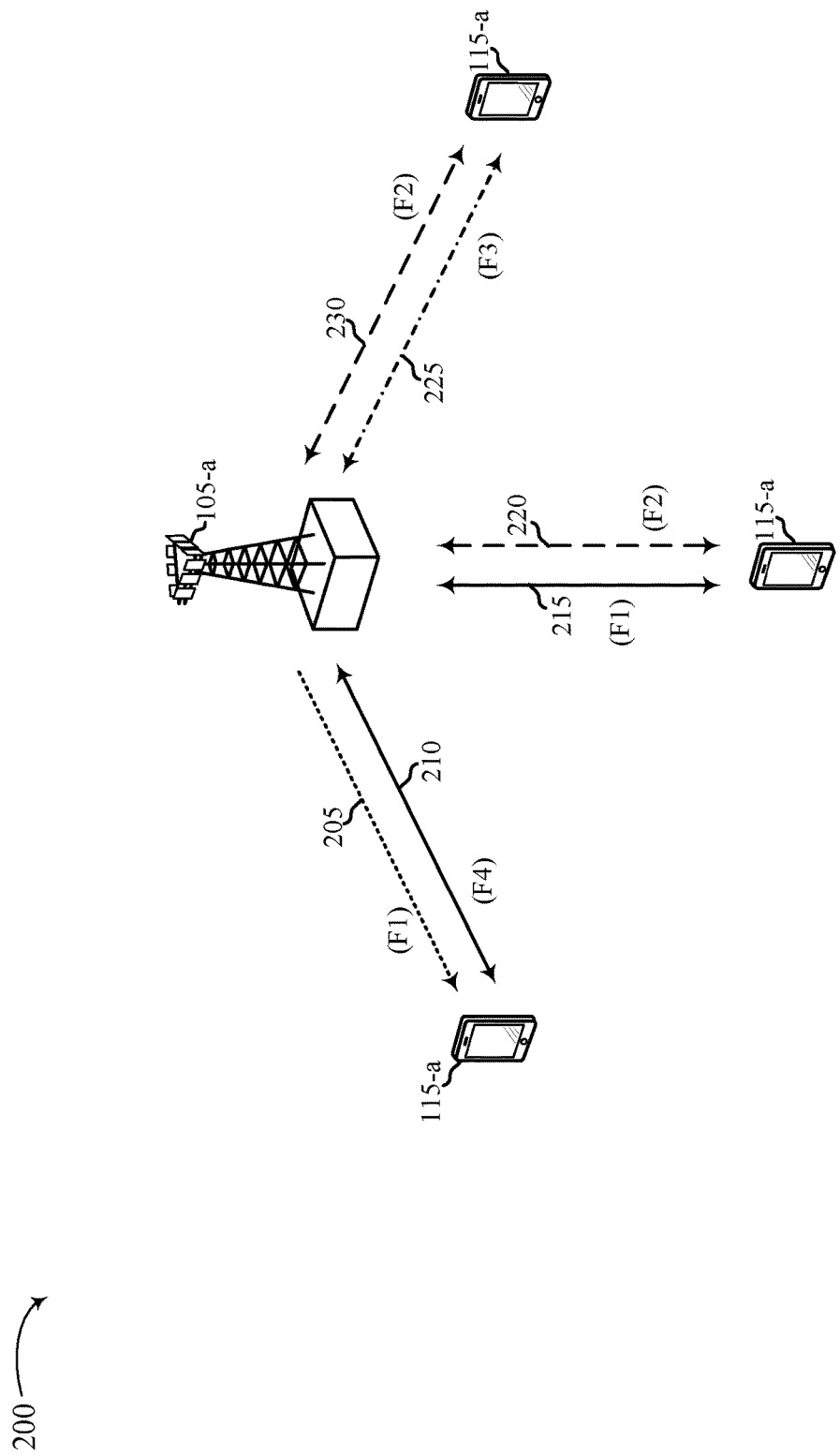
FIG. 2 illustrates examples of deployment scenarios for using LTE in an unlicensed spectrum in accordance with aspects of the present disclosure.

Turning next to FIG. 2, a diagram 200 shows examples of a supplemental downlink mode (e.g., LAA mode) and of a carrier aggregation mode for an LTE network that supports LTE/LTE-A extended to contention-based shared spectrum. The diagram 200 may be an example of portions of the system 100 of FIG. 1. Moreover, the base station 105-a may be an example of the base stations 105 of FIG. 1, while the UEs 115-*a* may be examples of the UEs 115 of FIG. 1.

As noted above, the LAA for LTE may provide supplemental downlink service with secondary component carriers placed in the unlicensed spectrum (or "contention-based shared spectrum"). In the example of a supplemental downlink mode (e.g., LAA mode) in diagram 200, the base station 105-*a* may transmit OFDMA communications signals to a UE 115-*a* using a downlink 205. The downlink 205 is associated with a frequency F1 in an unlicensed spectrum. The base station 105-*a* may transmit OFDMA communications signals to the same UE 115-*a* using a bidirectional link 210 and may receive SC-FDMA communications signals from that UE 115-*a* using the bidirectional link 210. The bidirectional link 210 is associated with a frequency F4 in a licensed spectrum. The downlink 205 in the unlicensed spectrum and the bidirectional link 210 in the licensed spectrum may operate concurrently. The downlink 205 may provide a downlink capacity offload for the base station 105-*a*. In some embodiments, the downlink 205 may be used for unicast services (e.g., addressed to one UE) services or for multicast services (e.g., addressed to several UEs). This scenario may occur with any service provider (e.g., traditional mobile network operator or MNO) that uses a licensed spectrum and needs to relieve some of the traffic and/or signaling congestion.

In one example of a carrier aggregation mode in diagram 200, the base station 105-*a* may transmit OFDMA communications signals to a UE 115-*a* using a bidirectional link 215 and may receive SC-FDMA communications signals from the same UE 115-*a* using the bidirectional link 215. The bidirectional link 215 is associated with the frequency F1 in the unlicensed spectrum. The base station 105-*a* may also transmit OFDMA communications signals to the same UE 115-*a* using a bidirectional link 220 and may receive SC-FDMA communications signals from the same UE 115-*a* using the bidirectional link 220. The bidirectional link 220 is associated with a frequency F2 in a licensed spectrum. The bidirectional link 215 may provide a downlink and uplink capacity offload for the base station 105-*a*. Like the supplemental downlink (e.g., LAA mode) described above, this scenario may occur with any service provider (e.g., MNO) that uses a licensed spectrum and needs to relieve some of the traffic and/or signaling congestion.

In another example of a carrier aggregation mode in diagram 200, the base station 105-*a* may transmit OFDMA communications signals to a UE 115-*a* using a bidirectional link 225 and may receive SC-FDMA communications signals from the same UE 115-*a* using the bidirectional link 225. The bidirectional link 225 is associated with the frequency F3 in an unlicensed spectrum. The base station 105-*a* may also transmit OFDMA communications signals to the same UE 115-*a* using a bidirectional link 230 and may receive SC-FDMA communications signals from the same UE 115-*a* using the bidirectional link 230. The bidirectional link 230 is associated with the frequency F2 in the licensed spectrum. The bidirectional link 225 may provide a downlink and uplink capacity offload for the base station 105-*a*. This example and those provided above are presented for illustrative purposes and there may be other similar modes of operation or deployment scenarios that combine LTE/LTE-A with or without contention-based shared spectrum for capacity offload.

As described above, the typical service provider that may benefit from the capacity offload offered by using LTE/LTE-A extended to contention-based spectrum is a traditional MNO with LTE spectrum. For these service providers, an operational configuration may include a bootstrapped mode (e.g., supplemental downlink (e.g., LAA mode), carrier aggregation) that uses the LTE primary component carrier (PCC) on the non-contention spectrum and the LTE secondary component carrier (SCC) on the contention-based spectrum.

In the carrier aggregation mode, data and control may be communicated in LTE (e.g., bidirectional links 210, 220, and 230) while data may be communicated in LTE/LTE-A extended to contention-based shared spectrum (e.g., bidirectional links 215 and 225). The carrier aggregation mechanisms supported when using LTE/LTE-A extended to contention-based shared spectrum may fall under a hybrid frequency division duplexing-time division duplexing (FDD-TDD) carrier aggregation or a TDD-TDD carrier aggregation with different symmetry across component carriers.

Figure 3:
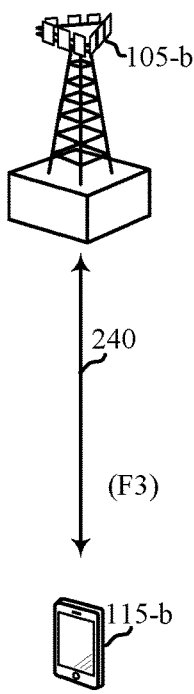
FIG. 3 illustrates another example of deployment scenarios for using LTE in an unlicensed spectrum in accordance with aspects of the present disclosure.

FIG. 3 shows a diagram 300 that illustrates an example of a standalone mode for LTE/LTE-A extended to contention-based shared spectrum. The diagram 300 may be an example of portions of the system 100 of FIG. 1. Moreover, the base station 105-*b* may be an example of the base stations 105 of FIG. 1 and the base station 105-*a* of FIG. 2A, while the UE 115-*b* may be an example of the UEs 115 of FIG. 1 and the UEs 115-*a* of FIG. 2A.

In the example of a standalone mode in diagram 300, the base station 105-*b* may transmit OFDMA communications signals to the UE 115-*b* using a bidirectional link 240 and may receive SC-FDMA communications signals from the UE 115-*b* using the bidirectional link 240. The bidirectional link 240 is associated with the frequency F3 in a contention-based shared spectrum described above with reference to FIG. 2. The standalone mode may be used in non-traditional wireless access scenarios, such as in-stadium access (e.g., unicast, multicast). An example of the typical service provider for this mode of operation may be a stadium owner, cable company, event hosts, hotels, enterprises, and large corporations that do not provide designated licensed spectrum. For these service providers, an operational configuration for the standalone mode may use the PCC on the contention-based spectrum. Moreover, LBT may be implemented on both the base station and the UE.

In some examples, a transmitting apparatus such as one of the base stations 105 or one or more UEs 115 described with reference to FIG. 1, 2, or 3, may use a gating interval to gain access to a channel of a contention-based shared radio frequency spectrum band (e.g., to a physical channel of an unlicensed radio frequency spectrum band). In some examples, the gating interval may be periodic. For example, the periodic gating interval may be synchronized with at least one boundary of an LTE/LTE-A radio interval. The gating interval may define the application of a contention-based protocol, such as an LBT protocol based at least in part on the LBT protocol specified in European Telecommunications Standards Institute (ETSI) (EN 301 893). When using a gating interval that defines the application of an LBT protocol, the gating interval may indicate when a transmitting apparatus needs to perform a contention procedure (e.g., an LBT procedure) such as a clear channel assessment (CCA) procedure. The outcome of the CCA procedure may indicate to the transmitting apparatus whether a channel of a contention-based shared radio frequency spectrum band is available or in use for the gating interval (also referred to as an LBT radio frame). When a CCA procedure indicates that the channel is available for a corresponding LBT radio frame (e.g., "clear" for use), the transmitting apparatus may reserve or use the channel of the contention-based shared radio frequency spectrum band during part or all of the LBT radio frame. When the CCA procedure indicates that the channel is not available (e.g., that the channel is in use or reserved by another transmitting apparatus), the transmitting apparatus may be prevented from using the channel during the LBT radio frame.

The number and arrangement of components shown in FIGS. 2 and 3 are provided as an example. In practice, wireless communication system 200 may include additional devices, fewer devices, different devices, or differently arranged devices than those shown in FIGS. 2 and 3.

Figure 4A:
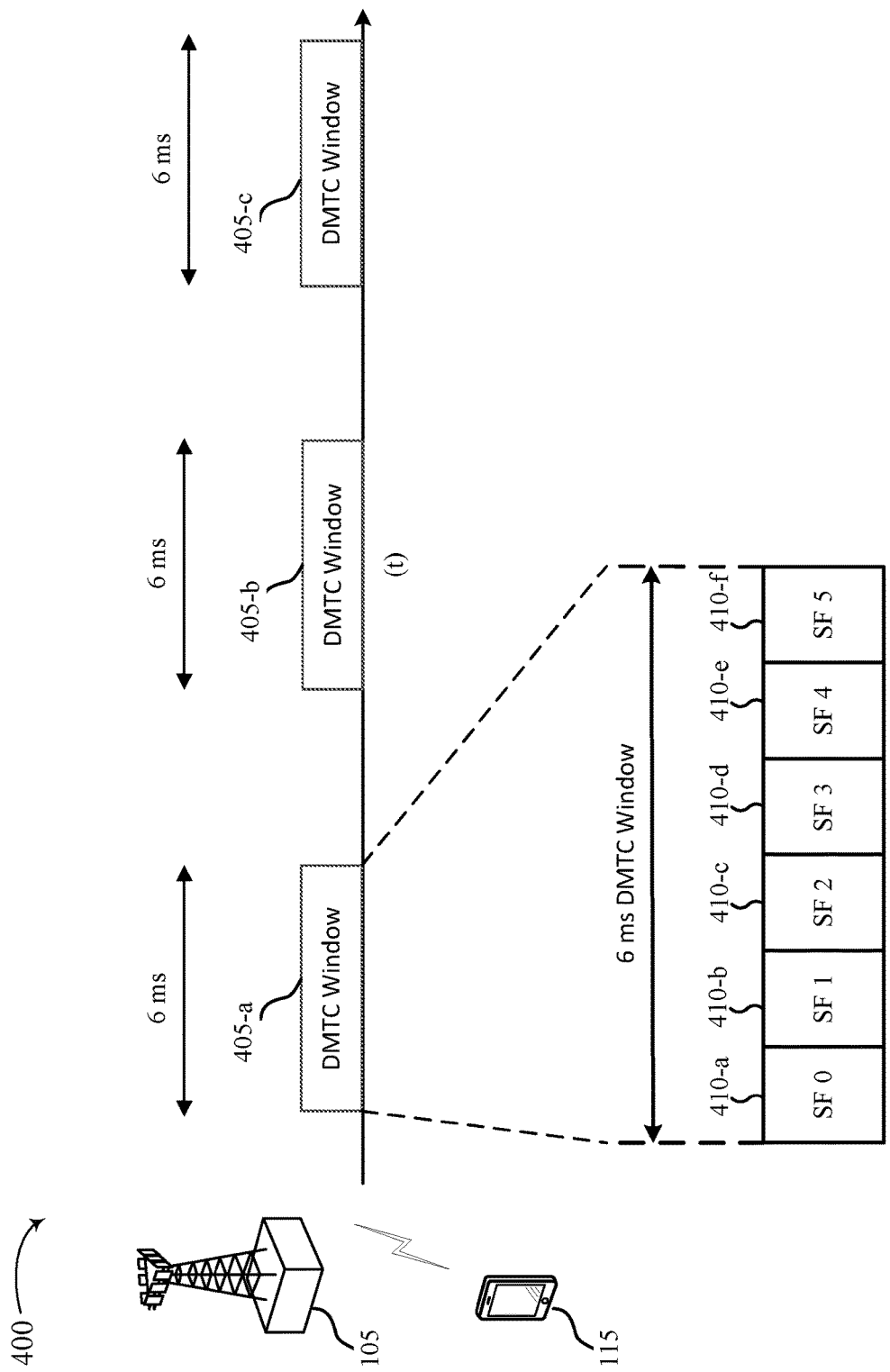
FIGS. 4A-4D illustrate various DRS search modes implemented by the UE in accordance with aspects of the present disclosure.

FIGS. 4A-4D illustrate various DRS search modes implemented by the UE 115 in accordance with aspects of the present disclosure. Turning first to FIG. 4A, a timing diagram 400 in accordance with aspects of the present disclosure is illustrated. For context, the timing diagram 400 may include communications from the network (e.g., base station 105) to one or more UEs 115 described with reference to FIGS. 1-3.

As noted above, 3GPP has introduced LAA for LTE to provide supplemental downlink service with secondary component carriers placed on unlicensed 5 GHz spectrum. Certain regulations require unlicensed spectrum to be shared in time by users (e.g., LAA or WiFi) according to the LBT protocol. Due to the LBT requirements, communication and traffic on an unlicensed spectrum may be bursty (large quantity of data transmitted during short time periods). As such, the system may not be able to guarantee a fixed transmission timing (i.e., reference signals transmitted during at predetermined location and time). This may pose a challenge for RRM since the RRM replies on the persistent presence of PSS/SSS/CRS signals for cell search and measurement. In order to increase the likelihood of PSS/SSS/CRS transmission for RRM, LAA has adopted the DRS. The DRS may be a subframe that contains PSS/SSS/CRS/CSI-RS. The LAA may transmit the DRS on any subframe within a predetermined DMTC window 405 that may be 6 ms window. Within each DMTC window 405, the RRM (or base station 105) may transmit one or more subframes 410.

For communication in unlicensed LAA, RRM measurements for unlicensed carriers may be based on DRS that may float within the DMTC window 405. For example, the DRS signal may be transmitted in any one or more of the subframes 410 by the network. A DRS occasion from a cell may consist of 12 OFDM symbols with PSS/SSS/CRS/CSI-RS. In some examples, the DMTC window may be defined with respect to PCell subframe boundary, and the periodicity of the DMTC window may be 40 ms, 80 ms, or 160 ms. For purposes of this disclosure, the term "floating" location may refer to the concept that DRS may occur in any subframe within the 6 ms DMTC window 405 subject to LBT. The DMTC window 405 may provide the base station 105 with opportunities of accessing the wireless medium through LBT procedure. Furthermore, DRS subframe location may vary from one DMTC window 405 to the next. For example, in the first DMTC window 405-a, the DRS subframe location may be in the fourth subframe 410-e, whereas the DRS subframe location for second DMTC window 405-b may be in the second subframe 410-b (not shown).

Figure 4B:
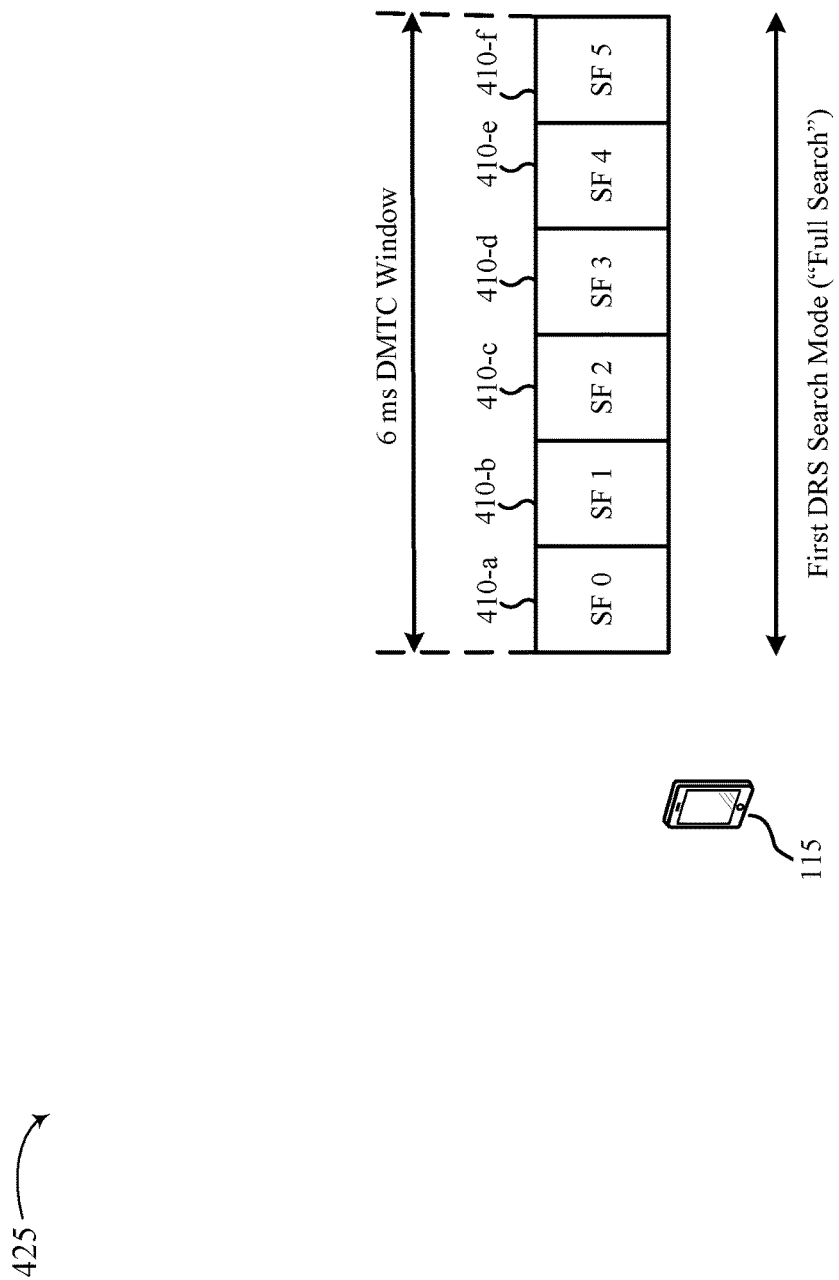
Figure 4C:
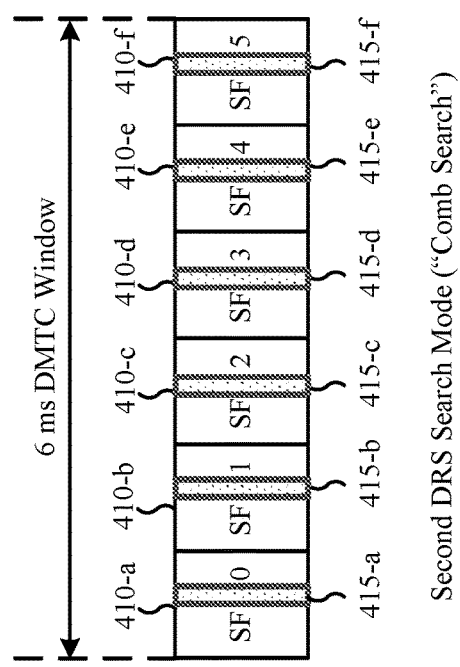
Figure 4C:
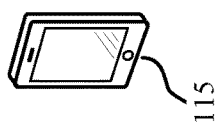

Aspects of the present disclosure provide a plurality of DRS search modes that may be selected based on various degrees of tradeoff between robustness and complexity. For example, the plurality of DRS search modes may include a first DRS search mode ("Full search mode"), as illustrated in FIG. 4B, that may search each OFDM symbol of each subframe 410 within the DMTC window 405. The first DRS search mode may provide the highest cycle cost, but may offer relatively high robustness and accuracy of successfully locating the DRS subframe location. Additionally, the first DRS search mode may support both asynchronous and synchronous neighbor. Even further, the first DRS search mode may support floating DRS.

Alternatively, the UE may select a second DRS search mode ("Comb search") from the plurality of DRS search modes available to the UE. The searching concept of the second DRS search mode is illustrated with reference to FIG. 4C. If the second DRS search mode is selected by the UE 115, the UE 115 may search 6 narrow windows around the 6 PCell PSS symbol boundaries in DMTC window 405. Thus, while the second DRS search mode searches each subframe 410, the UE 115 may only search a portion of the subframe 410. As such, the UE 115 in the second DRS search mode may only search a subset of samples from a full set of OFDM symbols received in each subframe 410. The DRS search location 415 within each subframe 410 may be based on the determination that the secondary carrier timing is within a predefined offset from the known timing of the primary carrier (transmitted in the licensed spectrum). As such, because the DRS search location may not exceed the predefined offset, the UE 115 in the second DRS search mode may select locations around the PCell PSS symbol boundaries within the DMTC window 405. In some examples, the second DRS search mode may be limited to synchronous neighbors. Additionally, it may offer reduced cycle and search timing requirements on the UE 115 that may conserve power.

Figure 4D:
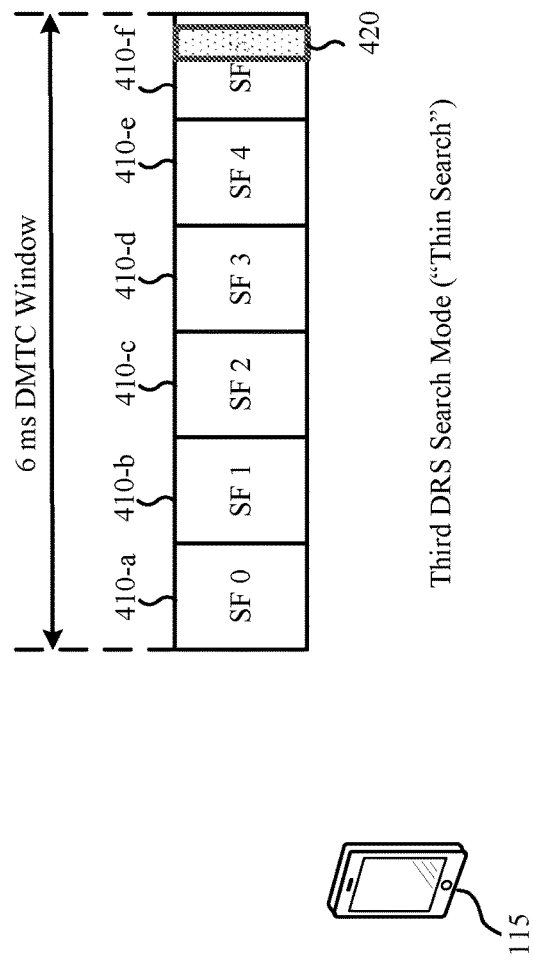

Additionally, the UE 115 may operate in a third DRS search mode ("Thin search"), as illustrated in FIG. 4D, where the UE 115 may only search one narrow 420 portion around PCell PSS symbol boundary of either the first subframe 415-*a* or the subframe 5 415-*f* The third DRS search mode may offer the lowest robustness and only support synchronous network. Additionally, the UE 115 may be limited to supporting only fixed DRS locations, and not floating DRS. However, the third DRS search mode may offer advantages in terms of reduced cycle costs in part to searching only one narrow window within the DMTC window 405. This may significantly reduce the search timeline for the UE and offer most efficient resource manager if the DRS subframe location is fixed within the DMTC window 405, which may occur when the network operator selects a simplified LAA network configuration.

Features of the present disclosure further provide techniques for switching between the first DRS search mode, the second DRS search mode, or the third DRS search mode. The first DRS search mode may be selected for the LAA carriers with unknown synchronization or floating/fixed DRS information. This may include, but not limited to, LAA inter-frequency carriers, when UE identifies PCell handover candidate which is not in sync with current PCell, or when the serving base station 105 intends to collect asynchronous neighbor measurement report from the UE for network planning, interference management, etc.

Alternatively, the UE 115 may select or dynamically switch from one of the DRS search modes to the second DRS search mode for LAA carriers in synch with PCC. This may include, but not be limited to PCell in good radio frequency quality that does not have a handover candidate available. Therefore, UE 115 may only consider LAA cells (both intra-frequency and inter-frequency) that may be synchronous with PCell.

Finally, the UE 115 may select or switch to a third DRS search mode for LAA carriers in sync with PCC and with a fixed DRS location. In this example, UE may trigger the third DRS search mode based on floating DRS detection record that is maintained by the UE 115.

Figure 5:
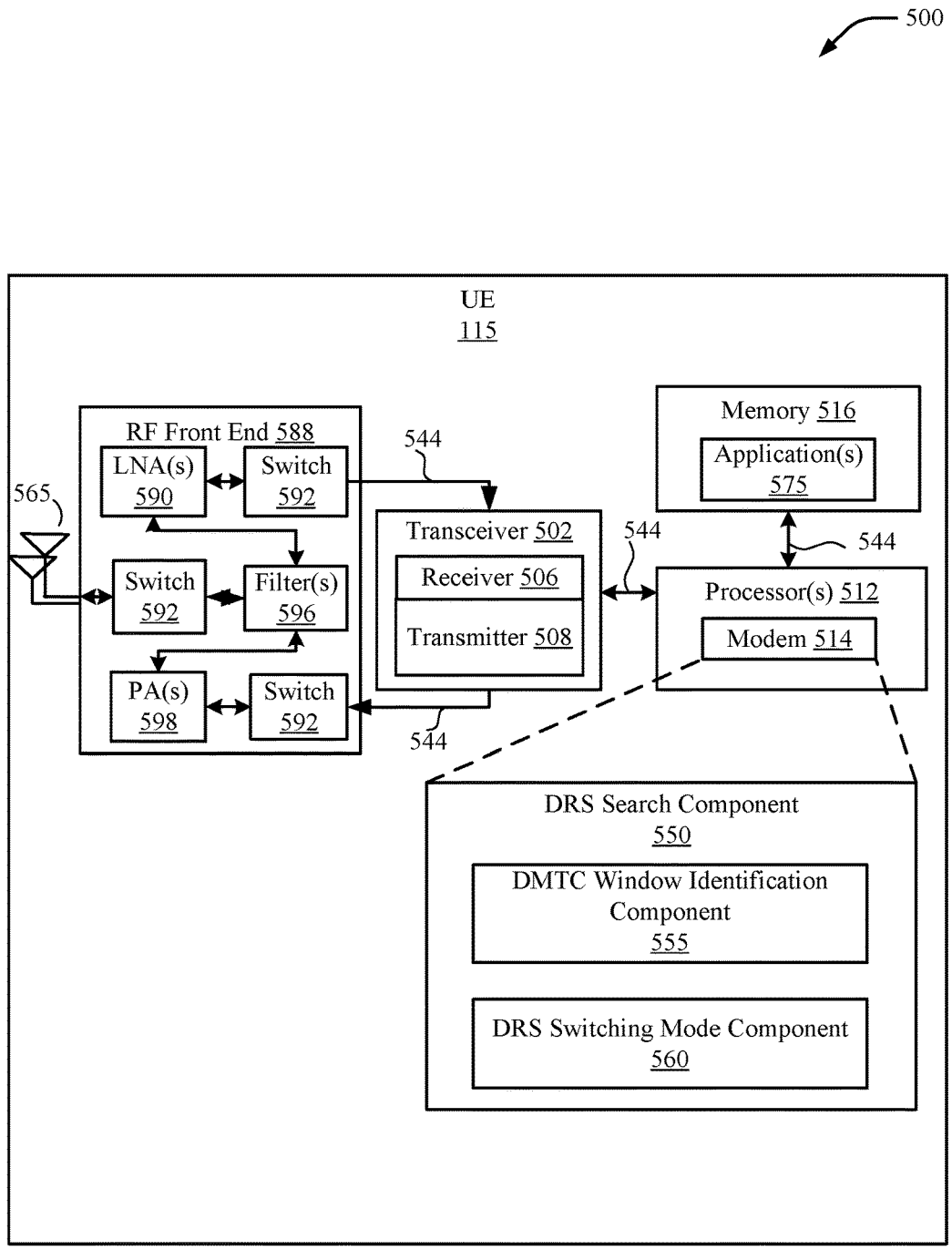
FIG. 5 is a schematic diagram of an aspect of an implementation of various components of the UE in accordance with various aspects of the present disclosure.

FIG. 5 describe hardware components and subcomponents of a UE 115 for implementing one or more methods (e.g., method 600) described herein in accordance with various aspects of the present disclosure. For example, one example of an implementation of the UE 115 may include a variety of components, some of which have already been described above, but including components such as one or more processors 512 and memory 516 and transceiver 502 in communication via one or more buses 544, which may operate in conjunction with the DRS search component 550 to enable one or more of the DRS search techniques and modes described herein related to including one or more methods of the present disclosure. Further, the one or more processors 512, modem 514, memory 516, transceiver 502, RF front end 588 and one or more antennas 565, may be configured to support voice and/or data calls (simultaneously or non-simultaneously) in one or more radio access technologies.

In an aspect, the one or more processors 512 can include a modem 514 that uses one or more modem processors. The various functions related to DRS search component 550 may be included in modem 514 and/or processors 512 and, in an aspect, can be executed by a single processor, while in other aspects, different ones of the functions may be executed by a combination of two or more different processors. For example, in an aspect, the one or more processors 512 may include any one or any combination of a modem processor, or a baseband processor, or a digital signal processor, or a transmit processor, or a receiver processor, or a transceiver processor associated with transceiver 502. In other aspects, some of the features of the one or more processors 512 and/or modem 514 associated with interleaving component 550 may be performed by transceiver 502. The DRS search component 550 may further include a DMTC window identification component 555 for identifying a DMTC window for receiving a DRS signal. The DRS search component 550 may include DRS switching mode component 560 for selecting a DRS search mode for the UE from a plurality of DRS search modes available to the UE. In some examples, the plurality of DRS search modes may include at least one or more of a first DRS search mode, a second DRS search mode, or a third DRS search mode. The DRS switching mode component 560 may further be configured to dynamically switch between the first DRS search mode, the second DRS search mode, or the third DRS search mode based on the determination of system and network requirements (e.g., power consumption of UE, or whether LAA carriers are in sync with PCC, or whether the DRS location is a fixed or floating location).

Also, memory 516 may be configured to store data used herein and/or local versions of applications or DRS switching mode component 550 and/or one or more of its subcomponents being executed by at least one processor 512. Memory 516 can include any type of computer-readable medium usable by a computer or at least one processor 512, such as random access memory (RAM), read only memory (ROM), tapes, magnetic discs, optical discs, volatile memory, non-volatile memory, and any combination thereof. In an aspect, for example, memory 516 may be a non-transitory computer-readable storage medium that stores one or more computer-executable codes defining interleaving component 550 and/or one or more of its subcomponents, and/or data associated therewith, when UE 115 is operating at least one processor 512 to execute DRS switching mode component 550 and/or one or more of its subcomponents.

Transceiver 502 may include at least one receiver 506 and at least one transmitter 508. Receiver 506 may include hardware, firmware, and/or software code executable by a processor for receiving data, the code comprising instructions and being stored in a memory (e.g., computer-readable medium). Receiver 506 may be, for example, a radio frequency (RF) receiver. In an aspect, receiver 506 may receive signals transmitted by at least one base station 105. Additionally, receiver 506 may process such received signals, and also may obtain measurements of the signals, such as, but not limited to, Ec/Io, SNR, RSRP, RSSI, etc. Transmitter 508 may include hardware, firmware, and/or software code executable by a processor for transmitting data, the code comprising instructions and being stored in a memory (e.g., computer-readable medium). A suitable example of transmitter 508 may including, but is not limited to, an RF transmitter.

Moreover, in an aspect, transmitting device may include RF front end 588, which may operate in communication with one or more antennas 565 and transceiver 502 for receiving and transmitting radio transmissions, for example, wireless communications transmitted by at least one base station 105 or wireless transmissions transmitted by UE 115. RF front end 588 may be connected to one or more antennas 565 and can include one or more low-noise amplifiers (LNAs) 590, one or more switches 592, one or more power amplifiers (PAs) 598, and one or more filters 596 for transmitting and receiving RF signals.

In an aspect, LNA 590 can amplify a received signal at a desired output level. In an aspect, each LNA 590 may have a specified minimum and maximum gain values. In an aspect, RF front end 588 may use one or more switches 592 to select a particular LNA 590 and its specified gain value based on a desired gain value for a particular application.

Further, for example, one or more PA(s) 598 may be used by RF front end 588 to amplify a signal for an RF output at a desired output power level. In an aspect, each PA 598 may have specified minimum and maximum gain values. In an aspect, RF front end 588 may use one or more switches 592 to select a particular PA 598 and its specified gain value based on a desired gain value for a particular application.

Also, for example, one or more filters 596 can be used by RF front end 588 to filter a received signal to obtain an input RF signal. Similarly, in an aspect, for example, a respective filter 596 can be used to filter an output from a respective PA 598 to produce an output signal for transmission. In an aspect, each filter 696 can be connected to a specific LNA 590 and/or PA 598. In an aspect, RF front end 588 can use one or more switches 592 to select a transmit or receive path using a specified filter 596, LNA 590, and/or PA 598, based on a configuration as specified by transceiver 502 and/or processor 612.

As such, transceiver 502 may be configured to transmit and receive wireless signals through one or more antennas 565 via RF front end 588. In an aspect, transceiver may be tuned to operate at specified frequencies such that UE can communicate with, for example, one or more base stations 105 or one or more cells associated with one or more base stations 105, or other UEs 115. In an aspect, for example, modem 514 can configure transceiver 502 to operate at a specified frequency and power level based on the configuration of the transmitting device and the communication protocol used by modem 514.

In an aspect, modem 514 can be a multiband-multimode modem, which can process digital data and communicate with transceiver 502 such that the digital data is sent and received using transceiver 502. In an aspect, modem 514 can be multiband and be configured to support multiple frequency bands for a specific communications protocol. In an aspect, modem 514 can be multimode and be configured to support multiple operating networks and communications protocols. In an aspect, modem 514 can control one or more components of transmitting device (e.g., RF front end 588, transceiver 502) to enable transmission and/or reception of signals from the network based on a specified modem configuration. In an aspect, the modem configuration can be based on the mode of the modem and the frequency band in use. In another aspect, the modem configuration can be based on UE configuration information associated with transmitting device as provided by the network during cell selection and/or cell reselection.

Figure 6:
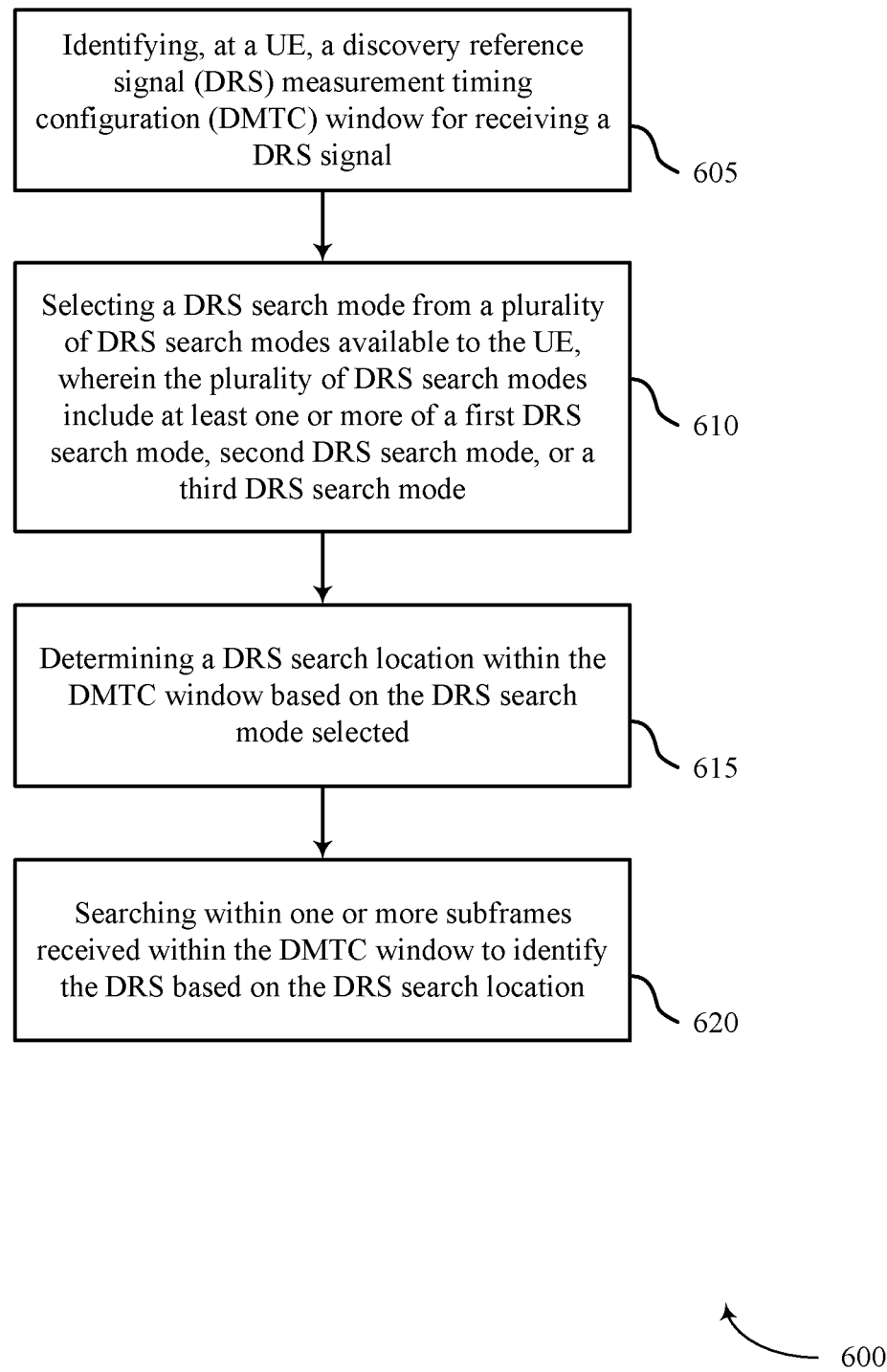
FIG. 6 illustrates a method of selecting and switching the DRS modes from a plurality of DRS modes available to UE in accordance with aspects of the present disclosure.

FIG. 6 is a flowchart of an example method 600 for wireless communications in an unlicensed spectrum in accordance with aspects of the present disclosure. The method 600 may be performed using the UE 115, for example. Although the method 600 is described below with respect to the elements of the UE 115, other components may be used to implement one or more of the steps described herein.

At block 605, the method 600 may include identifying, at a UE, a DRS measurement timing configuration (DMTC) window for receiving a DRS signal. Aspects of block 605 may be performed by DMTC window identification component 555 described with reference to FIG. 5.

At block 610, the method 600 may include selecting a DRS search mode for the UE from a plurality of DRS search modes available to the UE. The plurality of DRS search modes may include at least one or more of a first DRS search mode, second DRS search mode, or a third DRS search mode. The UE 115 in the first DRS search mode may search each OFDM symbol of a plurality of subframes received during the DMTC window (e.g., search entire 6 ms DMTC window). Alternatively, the UE 115 in the second DRS search mode may search a subset of samples from a plurality of OFDM symbols for each of a plurality of subframes received during the DMTC window. Further, the UE 115 in the third DRS search mode may search a subset of samples from a plurality of OFDM symbols for a single subframe of a plurality of subframes received during the DMTC window. In some examples, the UE 115 may dynamically switch between the first DRS search mode, second DRS search mode, or a third DRS search mode depending on the UE requirements (e.g., power and resource utilization) and the network configuration (i.e., whether asynchronous and/or synchronous neighbor is to be supported and/or whether the DRS location is a fixed or floating location). Aspects of block 610 may be performed by DRS switching mode component 560 described with reference to FIG. 5.

At block 615, the method 600 may include determining a DRS search location within the DMTC window based on the DRS search mode selected. Aspects of block 615 may be performed by DRS search component 550 described with reference to FIG. 5.

At block 620, the method 600 may include searching, by the UE, within one or more subframes received within the DMTC window to identify the DRS signal. In some examples, based on the search, the UE 115 may further be configured to report at least one or more of RSRP or RSRQ for RRM measurements based on the DRS signal. Aspects of block 620 may be performed by DRS search component 550 described with reference to FIG. 5.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially-programmed device, such as but not limited to a processor, a digital signal processor (DSP), an ASIC, a FPGA or other programmable logic device, a discrete gate or transistor logic, a discrete hardware component, or any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

It should be noted that the techniques described above may be used for various wireless communication networks such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below, although the techniques are applicable beyond LTE/LTE-A applications (e.g., to 5G networks or other next generation communication systems).

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed is:

1. A method for wireless communications in an unlicensed spectrum, comprising:
    identifying, at a user equipment (UE), a discovery reference signal (DRS) measurement timing configuration (DMTC) window for receiving a DRS signal;
    selecting, by the UE, a DRS search mode for the UE from a plurality of DRS search modes available to the UE, wherein the plurality of DRS search modes include at least one or more of a first DRS search mode, a second DRS search mode, or a third DRS search mode;
    determining, by the UE, a DRS search location within the DMTC window based on the DRS search mode selected; and
    searching, by the UE, within one or more subframes received within the DMTC window to identify the DRS signal based on the DRS search location.

2. The method of claim 1, wherein the UE in the first DRS search mode searches each orthogonal frequency-division multiplexing (OFDM) symbol of a plurality of subframes received during the DMTC window.

3. The method of claim 1, wherein the UE in the second DRS search mode searches a subset of samples from a plurality of orthogonal frequency-division multiplexing (OFDM) symbols for each of a plurality of subframes received during the DMTC window.

4. The method of claim 1, wherein the UE in the third DRS search mode searches a subset of samples from a plurality of orthogonal frequency-division multiplexing (OFDM) symbols for a single subframe of a plurality of subframes received during the DMTC window.

5. The method of claim 1, further comprising:
    switching, by the UE, between the first DRS search mode, second DRS search mode, or a third DRS search mode.

6. The method of claim 1, further comprising:
    reporting, by the UE, at least one or more of a reference signal received power (RSRP) or reference signal received quality (RSRQ) for radio resource management (RRM) measurement based on the DRS signal.

7. The method of claim 1, wherein the DMTC window is a six millisecond (ms) window used to transmit DRS signals.

8. An apparatus for wireless communications in an unlicensed spectrum, comprising:
    a memory configured to store instructions; and
    a processor communicatively coupled with the memory, the processor configured to execute the instructions to:
        identify, at a user equipment (UE), a discovery reference signal (DRS) measurement timing configuration (DMTC) window for receiving a DRS signal;
        select, by the UE, a DRS search mode from a plurality of DRS search modes available to the UE, wherein the plurality of DRS search modes include at least one or more of a first DRS search mode, a second DRS search mode, or a third DRS search mode;
        determine, by the UE, a DRS search location within the DMTC window based on the DRS search mode selected; and
        search, by the UE, within one or more subframes received within the DMTC window to identify the DRS based on the DRS search location.

9. The apparatus of claim 8, wherein the UE in the first DRS search mode searches each orthogonal frequency-division multiplexing (OFDM) symbol of a plurality of subframes received during the DMTC window.

10. The apparatus of claim 8, wherein the UE in the second DRS search mode searches a subset of samples from a plurality of orthogonal frequency-division multiplexing (OFDM) symbols for each of a plurality of subframes received during the DMTC window.

11. The apparatus of claim 8, wherein the UE in the third DRS search mode searches a subset of samples from a plurality of orthogonal frequency-division multiplexing (OFDM) symbols for a single subframe of a plurality of subframes received during the DMTC window.

12. The apparatus of claim 8, wherein the processor is further configured to execute the instructions to:
switch, by the UE, between the first DRS search mode, second DRS search mode, or a third DRS search mode.

13. The apparatus of claim 8, wherein the processor is further configured to execute the instructions to:
report, by the UE, at least one or more of a reference signal received power (RSRP) or reference signal received quality (RSRQ) for radio resource management (RRM) measurement based on the DRS signal.

14. The apparatus of claim 8, wherein the DMTC window is a six millisecond (ms) window used to transmit DRS signals.

15. A non-transitory computer readable medium for wireless communications in an unlicensed spectrum, comprising code for:
identifying, at a user equipment (UE), a discovery reference signal (DRS) measurement timing configuration (DMTC) window for receiving a DRS signal;
selecting, by the UE, a DRS search mode from a plurality of DRS search modes available to the UE, wherein the plurality of DRS search modes include at least one or more of a first DRS search mode, a second DRS search mode, or a third DRS search mode;
determining, by the UE, a DRS search location within the DMTC window based on the DRS search mode selected; and
searching, by the UE, within one or more subframes received within the DMTC window to identify the DRS based on the DRS search location.

16. The non-transitory computer readable medium of claim 15, wherein the UE in the first DRS search mode searches each orthogonal frequency-division multiplexing (OFDM) symbol of a plurality of subframes received during the DMTC window.

17. The non-transitory computer readable medium of claim 15, wherein the UE in the second DRS search mode searches a subset of samples from a plurality of orthogonal frequency-division multiplexing (OFDM) symbols for each of a plurality of subframes received during the DMTC window.

18. The non-transitory computer readable medium of claim 15, wherein the UE in the third DRS search mode searches a subset of samples from a plurality of orthogonal frequency-division multiplexing (OFDM) symbols for a single subframe of a plurality of subframes received during the DMTC window.

19. The non-transitory computer readable medium of claim 15, further comprising code for:
switching, by the UE, between the first DRS search mode, second DRS search mode, or a third DRS search mode.

20. The non-transitory computer readable medium of claim 15, further comprising code for:
reporting, by the UE, at least one or more of a reference signal received power (RSRP) or reference signal received quality (RSRQ) for radio resource management (RRM) measurement based on the DRS signal.

21. The non-transitory computer readable medium of claim 15, wherein the DMTC window is a six millisecond (ms) window used to transmit DRS signals.

22. An apparatus for wireless communications in an unlicensed spectrum, comprising:
means for identifying, at a user equipment (UE), a discovery reference signal (DRS) measurement timing configuration (DMTC) window for receiving a DRS signal;
means for selecting, by the UE, a DRS search mode for the UE from a plurality of DRS search modes available to the UE, wherein the plurality of DRS search modes include at least one or more of a first DRS search mode, a second DRS search mode, or a third DRS search mode;
means for determining, by the UE, a DRS search location within the DMTC window based on the DRS search mode selected; and
means for searching, by the UE, within one or more subframes received within the DMTC window to identify the DRS signal based on the DRS search location.

23. The apparatus of claim 22, wherein the UE in the first DRS search mode searches each orthogonal frequency-division multiplexing (OFDM) symbol of a plurality of subframes received during the DMTC window.

24. The apparatus of claim 22, wherein the UE in the second DRS search mode searches a subset of samples from a plurality of orthogonal frequency-division multiplexing (OFDM) symbols for each of a plurality of subframes received during the DMTC window.

25. The apparatus of claim 22, wherein the UE in the third DRS search mode searches a subset of samples from a plurality of orthogonal frequency-division multiplexing (OFDM) symbols for a single subframe of a plurality of subframes received during the DMTC window.

26. The apparatus of claim 22, further comprising:
means for switching, by the UE, between the first DRS search mode, second DRS search mode, or a third DRS search mode.

27. The apparatus of claim 22, further comprising:
means for reporting, by the UE, at least one or more of a reference signal received power (RSRP) or reference signal received quality (RSRQ) for radio resource management (RRM) measurement based on the DRS signal.

28. The apparatus of claim 22, wherein the DMTC window is a six millisecond (ms) window used to transmit DRS signals.

* * * * *